United States Patent
Moshchuk et al.

(10) Patent No.: US 9,069,766 B2
(45) Date of Patent: Jun. 30, 2015

(54) CONTENT-BASED ISOLATION FOR COMPUTING DEVICE SECURITY

(71) Applicant: Microsoft Corporation, Redmond, WA (US)

(72) Inventors: Alexander Nikolaevich Moshchuk, Kirkland, WA (US); Jiahe H. Wang, Redmond, WA (US); Yunxin Liu, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 13/667,371

(22) Filed: Nov. 2, 2012

(65) Prior Publication Data

US 2014/0130150 A1    May 8, 2014

(51) Int. Cl.
| | |
|---|---|
| G06F 11/00 | (2006.01) |
| G06F 11/30 | (2006.01) |
| G06F 21/53 | (2013.01) |
| G06F 17/30 | (2006.01) |
| G06F 9/455 | (2006.01) |

(52) U.S. Cl.
CPC ............. *G06F 11/30* (2013.01); *G06F 21/53* (2013.01); *G06F 17/30067* (2013.01)

(58) Field of Classification Search
CPC ............. G06F 9/45533; G06F 9/3885; G06F 2221/2113; G06F 2221/2149; G06F 2221/2141; G06F 21/00; G06F 21/53; G06F 21/6218; G06F 2201/87; G06F 11/30; G06F 17/30067; H04L 63/105; H04L 63/10
See application file for complete search history.

(56) References Cited

U.S. PATENT DOCUMENTS

| | | | |
|---|---|---|---|
| 7,836,303 B2 | 11/2010 | Levy et al. | |
| 7,954,150 B2* | 5/2011 | Croft et al. | 726/21 |
| 8,056,119 B2* | 11/2011 | Gillet et al. | 726/2 |
| 2002/0099952 A1* | 7/2002 | Lambert et al. | 713/200 |
| 2005/0268336 A1* | 12/2005 | Finnegan | 726/15 |
| 2006/0143715 A1* | 6/2006 | Chow et al. | 726/27 |
| 2006/0288238 A1* | 12/2006 | Ray et al. | 713/193 |
| 2007/0130621 A1* | 6/2007 | Marinescu et al. | 726/22 |
| 2007/0186212 A1* | 8/2007 | Mazzaferri et al. | 718/1 |
| 2007/0226773 A1* | 9/2007 | Pouliot | 726/1 |
| 2008/0313648 A1 | 12/2008 | Wang et al. | |
| 2009/0183155 A1 | 7/2009 | Praitis et al. | |
| 2011/0067105 A1* | 3/2011 | Wolfe et al. | 726/23 |

(Continued)

OTHER PUBLICATIONS

Efstathopoulos, et al., "Labels and Event Processes in the Asbestos Operating System", In Proceedings of the Twentieth ACM Symposium on Operating Systems Principles, Oct. 23, 2005, pp. 1-14.

(Continued)

*Primary Examiner* — Dede Zecher
*Assistant Examiner* — Trang Doan
(74) *Attorney, Agent, or Firm* — Julie Kane Akhter; Stein Dolan; Micky Minhas

(57) ABSTRACT

The subject disclosure is directed towards securing a computing device using content-based isolation. When the computing device requests content data having different ownership, a monitor component identifies and groups trusted portions of the content data into one or more isolation containers such that only trusted programs are permitted access. Other programs are, therefore, untrusted and can be denied access in order to prevent malicious activity, unless access is approved by the content owner.

20 Claims, 8 Drawing Sheets

(56) References Cited

U.S. PATENT DOCUMENTS

| | | | |
|---|---|---|---|
| 2011/0145926 A1* | 6/2011 | Dalcher et al. | 726/26 |
| 2011/0296201 A1* | 12/2011 | Monclus et al. | 713/190 |
| 2011/0296487 A1* | 12/2011 | Walsh | 726/1 |
| 2012/0096158 A1* | 4/2012 | Astete et al. | 709/225 |

OTHER PUBLICATIONS

Gal, Tamir, "SharpSSH", Published on: Jan. 5, 2011, Available at: <http://www.tamirgal.com/blog/page/SharpSSH.aspx>, 2 pages.

Goldberg, et al., "A Secure Environment for Untrusted Helper Applications", In Proceedings of Sixth USENIX UNIX Security Symposium, Jul. 1996, pp. 1-14.

"Google Cloud Connect for Microsoft Office", Retrieved on: Apr. 18, 2012, Available at: <http://tools.google.com/dlpage/cloudconnect>, 2 pages, (Author unknown).

Grier, et al., "Secure Web Browsing with the OP Web Browser", In Proceedings of IEEE Symposium on Security and Privacy, May 18, 2008, pp. 402-416.

Huang, et al., "Protecting Browsers from Cross-Origin CSS Attacks", in Proceedings of 17th ACM Conference on Computer and Communications Security, Oct. 4, 2010, pp. 619-629.

Ioannidis, et al., "Building a Secure Web Browser", In Proceedings of FREENIX Track: USENIX Annual Technical Conference, Jun. 2001, pp. 127-134.

Ioannidis, et al., "Sub-operating Systems: A New Approach to Application Security", In Proceedings of 10th ACM SIGOPS European Workshop, Jul. 1, 2002, pp. 108-115.

Jackson, et al., "Beware of Finer-Grained Origins", In Proceedings of Web 2.0 Security and Privacy, May 2008, 7 pages.

"JavaScript for Acrobat", Retrieved on: Apr. 17, 2012, Available at: <http://www.adobe.com/devnet/acrobat/javascript.html>, 4 pages, (Author unknown).

Karlof, et al., "Dynamic Pharming Attacks and Locked Same-origin Policies for Web Browsers", In Proceedings of 14th ACM Conference on Computer and Communications Security, Oct. 29, 2007, pp. 58-71.

Kim, et al., "Making Linux Protection Mechanisms Egalitarian with UserFS", In Proceedings of 19th USENIX Conference on Security, Aug. 2010, pp. 13-27.

Krohn, et al., "Information Flow Control for Standard OS Abstractions", In Proceedings of 21st Symposium of Operating Systems Principles, Oct. 14, 2007, pp. 321-334.

Lawrence, Eric, "XDomainRequest—Restrictions, Limitations and Workarounds", Published on: May 13, 2010, Available at: <http://blogs.msdn.com/b/ieinternals/archive/2010/05/13/xdomainrequest-restrictions-limitations-and-workarounds.aspx>, 1 page.

Loscocco, et al., "Integrating Flexible Support for Security Policies into the Linux Operating System", In Proceedings of FREENIX Track: USENIX Annual Technical Conference, Jun. 28, 2001, pp. 29-42.

Reis, et al., "Isolating Web Programs in Modern Browser Architectures", In Proceedings of the 4th ACM European Conference on Computer Systems, Apr. 1, 2009, pp. 219-232.

Reis, et al., "Using Processes to Improve the Reliability of Browser-based Applications", Technical Report UW-CSE-2007-12-01, University of Washington, Dec. 2007, 13 pages.

Wang, et al., "Convergence of Desktop and Web Applications on a Multi-Service OS", In Proceedings of the 4th USENIX Conference on Hot Topics in Security, Aug. 2009, 6 pages.

Wang, et al., "Protection and Communication Abstractions for Web Browsers in MashupOS", In Proceedings of Twenty-first ACM SIGOPS Symposium on Operating Systems Principles, Oct. 2007, pp. 1-16.

Maeis, et al., "Object Capabilities and Isolation of Untrusted Web Applications", In Proceedings of IEEE Symposium on Security and Privacy (SP), May 16, 2010, pp. 125-140.

Huang, et al., "SecTop: A Data-Oriented Secure Desktop", CPSWeek 2010, in Workshop on Survivability in Cyberspace, Apr. 12, 2010, 5 pages.

Randolph, Kyle, "Adobe Secure Software Engineering Team—Inside Adobe Reader Protected Mode", Published on: Oct. 5, 2010, Available at:<http://blogs.adobe.com/asset/tag/protected-mode>, 6 pages.

"Adobe Security Bulletin Search", Published on: Jul. 19, 2011, Available at: <http://www.adobe.com/support/security/>, 35 pages, (Author unknown).

"AppArmor Application Security for Linux", Retrieved on: Apr. 18, 2012, Available at: <http://www.suse.com/support/security/>, 5 pages, (Author unknown).

Barth, et al., "Secure Content Sniffing for Web Browsers, or How to Stop Papers from Reviewing Themselves", In Proceedings of 30th IEEE Symposium on Security and Privacy, May 17, 2009, pp. 360-371.

Barth, et al., "Robust Defenses for Cross-Site Request Forgery", in Proceedings of 15th ACM Conference on Computer and Communications Security, Oct. 27, 2008, pp. 75-88.

"Build FAQ for OpenOffice.org", Retrieved on: Apr. 16, 2012, Available at: <http://www.openoffice.org/FAQs/build_faq.html>, 1 page, (Author unknown).

"Decentralized Identification", Retrieved on: Apr. 16, 2012, Available at: <http://www.waterken.com/dev/YURL/>, 3 pages, (Author unknown).

Cox, et al., "A Safety-Oriented Platform for Web Applications", in Proceedings of IEEE Symposium on Security and Privacy, May 21, 2006, pp. 350-364.

"Content Security Policy (csp)", Retrieved on: Apr. 17, 2012, Available at: <https://wiki.mozilla.org/Security/CSP/Spec>, 2 pages, (Author unknown).

Douceur, et al., "Leveraging Legacy Code to Deploy Desktop Applications on the Web", In Proceedings of 8th USENIX Conference on Operating Systems Design and Implementation, Dec. 2008, pp. 339-354.

Singh, et al., "On the Incoherencies in Web Browser Access ControlPolicies", in Proceedings of IEEE Symposium on Security and Privacy, May 16, 2010, pp. 463-478.

Tang, et al., "Trust and Protection in the Illinois Browser Operating System", in Proceedings of 9th USENIX Conference on Operating Systems Design and Implementation, Oct. 4, 2010, pp. 1-15.

Van Kesteren, Anne, "Cross-Origin Resource Sharing", Retrieved on: Apr. 17, 2012, Available at: <http://www.w3.org/TR/cors/>, 1 page.

Wahbe, et al., "Efficient Software-Based Fault Isolation", In Proceedings of Fourteenth ACM Symposium on Operating Systems Principles, Dec. 5, 1993, pp. 203-216.

Wang, et al., "Protection and Communication Abstractions for Web Browsers in MashupOS", In Proceedings of Twenty-first ACM SIGOPS Symposium on Operating Systems Principles, Oct. 14, 2007, pp. 1-10.

Wang, et al., "Protection and Communication Abstractions for Web Browsers in MashupOS", In Proceedings of Twenty-first ACM SIGOPS Symposium on Operating Systems Principles, Oct. 14, 2007, pp. 11-15.

Wang, et al., "The Multi-Principal OS Construction of the Gazelle Web Browser", In Proceedings of 19th Conference on USENIX Security Symposium, Aug. 11, 2010, pp. 1-10.

Wang, et al., "The Multi-Principal OS Construction of the Gazelle Web Browser", In Proceedings of 19th Conference on USENIX Security Symposium, Aug. 11, 2010, pp. 11-20.

Van Kesteren, Anne, "The XMLHttpRequest Object", Retrieved on: Apr. 17, 2012, Available at: <http://www.w3.org/TR/XMLHttpRequest/>, 1 page.

Yee, et al., "Native Client: A Sandbox for Portable, Untrusted X86 Native Code", In Proceedings of 30th IEEE Symposium on Security and Privacy, May 17, 2009, pp. 79-93.

Zeldovich, et al., "Making Information Flow Explicit in HiStar", in Proceedings of 7th USENIX Symposium on Operating Systems Design and Implementation, Nov. 6, 2006, pp. 263-278.

Moschuk, et al.., "Content-Based Isolation: Rethinking Isolation Policy in Modern Client Systems", Microsoft Research, Aug. 15, 2012, 14 pages.

(56) References Cited

OTHER PUBLICATIONS

"Protected View in Office 2010", Published on: Aug. 13, 2009, Available at: <http://blogs.technet.com/b/office2010/archive/2009/08/13/protected-view-in-office-2010.aspx>, 8 pages, (Author unknown).
"Remote Desktop Protocol", Retrieved on: Apr. 17, 2012, Available at: <http://msdn.microsoft.com/en-us/library/cc240445(Prot.10).aspx>, 4 pages, (Author unknown).
"Windows Internet API", Retrieved on: Apr. 17, 2012, Available at: <http://msdn.microsoft.com/en-us/library/aa385331(VS.85).aspx>, 3 pages, (Author unknown).
"Windows Vista Integrity Mechanism Technical Reference", Retrieved on: Apr. 17, 2012, Available at: <http://msdn.microsoft.com/en-us/library/bb625964.aspx>, 2 pages, (Author unknown).
"Microsoft Security Bulletins and Advisories", Retrieved on: Apr. 18, 2012, Available at: <http://technet.microsoft.com/en-us/security/bulletin>, 5 pages, (Author unknown).
Snake, "MS Office 2010 RTF Header Stack Overflow Vulnerability Exploit", Published on: Jul. 3, 2011, Available at: <http://www.exploit-db.com/exploits/17474/>, 4 pages.
Popa, et al., "HTTP as the NarrowWaist of the Future Internet", in Proceedings of Ninth ACM SIGCOMM Workshop on Hot Topics in Networks, Oct. 20, 2010, 6 pages.
Porter, et al., "Rethinking the Library OS from the Top Down", In Proceedings of Sixteenth International Conference on Architectural Support for Programming Languages and Operating Systems, Mar. 5, 2011, pp. 291-304.
"Programming Application-level Add-Ins", Retrieved on: Apr. 17, 2012, Available at: <http://msdn.microsoft.com/en-us/library/bb157876.aspx>, 7 pages, (Author unknown).
Qian, et al., "On Network-level Clusters for Spam Detection", In Proceedings of 17th Annual Network and Distributed System Security Symposium, Mar. 2, 2010, 17 pages.
Roesner, et al., "User-Driven Access Control: Rethinking Permission Granting in Modern Operating Systems", In Proceedings of 33rd IEEE Symposium on Security and Privacy, Mar. 2012, pp. 1-15.
Roesner, et al., "Detecting and Defending Against Third-Party Tracking on the Web", in Proceedings of 9th USENIX Symposium on Networked Systems Design and Implementation, Apr. 2012, pp. 1-14.
Ruderman, Jesse, "The Same-Origin Policy", Retrieved on: Apr. 17, 2012, Available at: <https://developer.mozilla.org/en/Same_origin_policy_for_JavaScript>, 3 pages.
Shapiro, et al., "Verifying the EROS Confinement Mechanism", In Proceedings of IEEE Symposium on Security and Privacy, May 14, 2000, pp. 166-176.
Foon, "Shatter Attacks—How to break Windows", Retrieved on: Apr. 17, 2012, Available at: <http://www.thehackademy.net/madchat/vxdevl/papers/winsys/shatter.html>, 6 pages.

* cited by examiner

CONTENT-BASED ISOLATION FOR COMPUTING DEVICE SECURITY

BACKGROUND

People operate a variety of software-based technologies when performing business and/or personal tasks. It has become increasingly important for software program developers (e.g., hardware, software application and/or operating system component developers) to ensure security and integrity for computing tasks involving critical or sensitive data, particularly in the face of threats (e.g., malicious software code). Software vulnerabilities, whether benign software code defects (e.g., bugs) or exploitable software code (e.g., buffer overflows, format string vulnerabilities and/or the like), may be exploited by such threats causing a number of problems for valued customers.

Software programs (or simply programs) often execute code and access resources via an operating system running on a computing device, such as a mobile phone, a desktop/laptop computer, a tablet device, a smartphone and/or the like. Conventional operating systems implement at least some isolation policy for securing data, such as a per-user isolation policy where users are isolated but each user's software programs run in a same isolation container or an application isolation policy where different software programs are isolated from one another. These isolation policies and other known isolation policies, however, are insufficient for protecting the computing devices from modern security challenges. Mutually distrusting content may interfere with one another, especially when processed by a single software program. To illustrate one example, attacker-crafted image data can compromise a photo editor program and misappropriate all images processed by that editor program. Furthermore, such isolation policies rely upon the user to make important security decisions, which places an unnecessary burden on the user and often results in failure when the user makes an incorrect decision. The isolation policy is a critical operating system security feature and notwithstanding perfect isolation mechanism/containers, an ill-designed isolation policy renders the computing device insecure.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards isolating content based upon content ownership. In one aspect, an isolation container secures content data from malicious activity when the content data corresponds to different yet trusted content owners. The isolation container may maintain the content data as an execution instance in order to achieve content-based isolation. In one aspect, an isolation policy is designed to determine, based upon content ownership, which execution instance(s), if any, can access specific portions of the content data. A principal labeling schema for the isolation policy may define content owner identifiers for individual content in order to distinguish trusted content from other/untrusted content.

Enforcing the isolation policy involves using the principal labeling schema to group trusted content into an appropriate isolation container. The principal labeling schema enables content-based isolation for a computing device. The principal labeling schema is used to generate content owner information and identify the content data corresponding to some user activity at the computing device. By implementing any compatible principal labeling schema for the isolation policy, a monitor component of the computing device prevents untrusted programs from accessing secure content and permits only trusted programs to process, store and/or modify such content.

In one aspect, a new isolation container is generated to secure the content data to which the monitor component assigns a principal label in accordance with the content-based isolation policy. In another aspect, the content data is admitted to an existing isolation container that comprises one or more trusted programs for processing the content data. The existing isolation container also may include other trust content.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
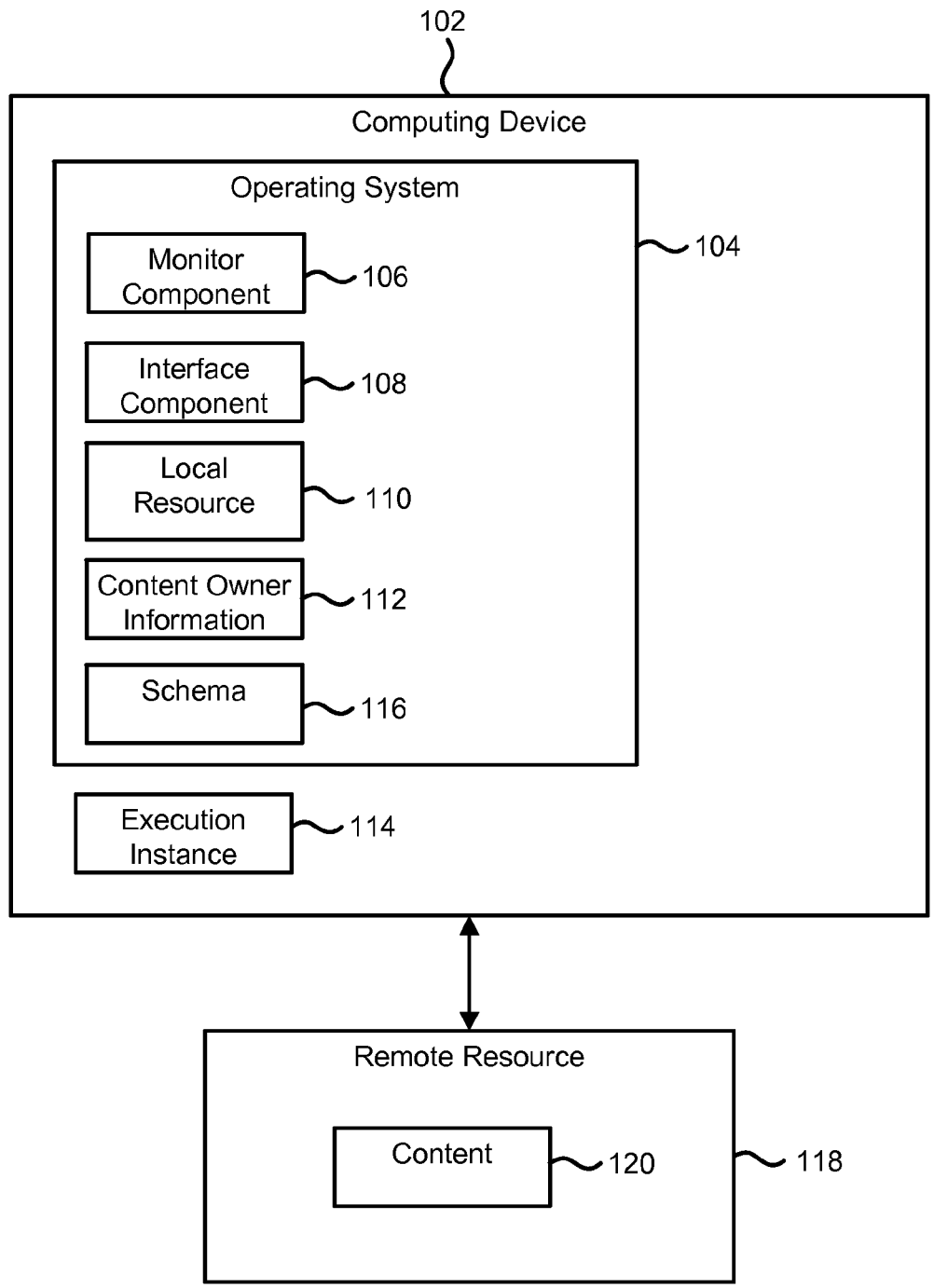
FIG. 1 is a block diagram illustrating an example system for content-based isolation according to one example implementation.

Various aspects of the technology described herein are generally directed towards a monitor component configured to secure a computing device comprising content data from malicious activity and/or misappropriation. The content data, for example, may store personal or sensitive information regarding a content owner or another entity, such as a user.

Each portion of the content data refers to a particular type of data, which may include image data, audio/video data, executable software code (e.g., a plug-in), text data and/or the like. The content data also may include documents, such as web documents (e.g., web pages), word processing documents, spreadsheet documents, photos and/or the like. The monitor component does not distinguish between static content (e.g., data, such as a word processing document) and dynamic content (e.g., executed code) when enforcing a content-based isolation policy since maliciously-engineered static file data can be converted into malicious code by exploiting memory errors in native software applications. The content data may be stored locally at a local resource and/or hosted by a remote recourse; and two or more portions of the content data may be assigned a same principal or a different principal according to a principal labeling schema.

The principal labeling schema enables isolation policy design for arbitrary granularities of addressable content (e.g., a file hosted by a server located at the URL). The most fine-grained principal includes, for example, a single document. The principal labeling schema may be configured to separate content ownership from content hosting such that content may be hosted anywhere and still be treated as belonging to a same principal. The isolation policy is configured to be suitable for all software programs, including traditional applications (e.g., word processing applications). Enforcing content-based isolation policies consolidates content isolation logic in the operating system, which reduces an isolation container's trusted computing base from trusting a substantial number of software applications to trusting the operating system.

The monitor component may support the operating system running at the computing device by implementing the principal labeling schema as described herein, identifying portions of the content data as trusted content and isolating an execution instance of the trusted content within an isolation container. Such an execution instance may be configured to prevent other/untrusted content from gaining access and/or prevent malicious portions of the trusted content from accessing content data at a remote resource. One example implementation represents the execution instance as a content processing stack comprising a top layer and one or more lower layers that correspond to one or more trusted programs for content at the top layer. The one or more trusted programs may be referred to herein as content processors. While such a content processing stack constitutes one example embodiment of the execution instance, it is appreciated that the execution instance may be expressed in other ways.

The monitor component enforces content-based isolation in which principal labels may identify content owners. In one example implementation, the monitor component enables a fine-grained, content-based isolation policy for securing the content data at the computing device. Based upon such a policy, the monitor component may identify a set of content having different content owners yet sharing mutual trust. The monitor component may maintain the set of content in an isolation container to block untrusted programs from accessing the content data and permit only the trusted programs. The monitor component also may delete isolation containers using such a policy.

According to another example implementation, the monitor component may provide a flexible approach to the content-based isolation policy enforcement by permitting cross-principal communication between disparate content that resolve to different principal labels. Some documents may not be mutually distrusting and may have intimate cross document interactions requiring substantially equal treatment as if these documents resolve to a same principal label. One example of an intimate cross-document interactions refers to a word processing document referencing (or embedding) a spreadsheet document. The word processing document and the spreadsheet document may have different origins, but it is desirable that these documents run in a same isolation container.

The principal labeling schema may define public keys for identifying content owners. A public key may be stored in a HTTP header attribute as a content owner identifier. Although the public key provides both arbitrary isolation granularity and independence from host servers, the monitor component may use the public key to customize a same origin policy, or an adapted version thereof, when assigning principal labels to the content data.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computing device security in general.

FIG. 1 is a block diagram illustrating an example system for content-based isolation according to one example implementation. The example system may include a client device 102 comprising various hardware and/or software components. An operating system 104 facilitates interactions between the various hardware and/or software components generally in response to user activity on the client device 102.

Various software components support the operating system 104 and facilitate program execution and data processing/storage for the client device 102. As described herein, a monitor component 106 may be configured to secure the client device 102 from unsafe or malicious threats. It is appreciated that the operating system 104 also may utilize one or more other components for various purposes, including an interface component 108 configured to access data stored locally and/or remotely. One example of the interface component 108 includes a storage component configured to access a local resource 110, such as a local software program (e.g., a traditional word processor or spreadsheet application), a local cache/memory, a local storage device and/or the like. Another example includes a browser component configured to retrieve content data from remote resources over the Internet. Yet another example includes a component for accessing remote resources over an Intranet.

As the user opens, creates and/or modifies various types of content, the monitor component 106 isolates such content within execution instances using content owner information 112 according to one example implementation. The monitor component 106 may group different content into a same execution instance if each piece of content belongs to a same content owner and/or if each content owner is trusted by at least all pieces of content currently in the same execution instance. The monitor component 106 may use any compatible isolation mechanism to encapsulate trusted content from content owners within each execution instance and generate an isolation container to secure the trusted content.

The content owner information 112 may record a principal label that maps to an example portion of content data (e.g., an electronic document), distinguishing that content from other content produced by other content owners. The monitor component 106 generates an execution instance 114, for example, to isolate the example portion of content data from untrusted content having a different principal label, such as an untrusted program. Only trusted content produced by a same content owner or a different but trusted content owner may access the execution instance 114. By preventing untrusted programs from accessing the example portion of content data and/or permitting admission into the execution instance 114 to only trusted programs, the monitor component 106 secures the example portion of content data from misappropriation due to malicious activity.

Based upon a principal labeling schema 116, the monitor component 106 determines a principal label for each portion of the content data. The principal labeling schema 116 generally defines trusted content groupings by which different portions of the content data are identified by content owner and isolated. If two or more content owners resolve to a same principal label, any content associated with these content owners may be maintained in the execution instance 114 or, alternatively, in different execution instances whereby access to each other's content is permitted. Within the execution instance 114, content may be processed by other trusted content, such as a trusted program. The principal label, therefore, separates content ownership from content hosting. Accordingly, a resource 118 may remotely host content 120 on behalf of a considerable number of content owners without risking such data from being compromised.

The principal labeling schema 116 may be configured to support traditional software applications where content owners often create content locally and then, separately upload the content to a host server where content is updated remotely. Consider an example in which a content owner "alice.com" created a number of word processing documents or photos to be uploaded onto various online storage services (e.g., Microsoft® SkyDrive) or photo sharing services. The principal labeling schema 116 assigns each individual document/photo to a same owner identifier of "alice.com" regardless of which service actually hosts that document/photo. A program running on the computing device 102, which may be operated by the content owner "alice.com", may access a document/photo hosted by one of the above online services if there is a trust relationship between the content owner identifier of "alice.com" and the program's principal label, as described further below.

One example implementation defines each principal label as an appropriate content owner identifier. The monitor component 106 assigns content owner identifiers to secure content data isolated within execution instances. Alternatively, the monitor component 106 stores a trust list for each portion of the secure content data. The execution instance 114 may be generated when the user, via a software program, opens a document "tax.doc" on a computing display. Communicating a request for another document "photo.jpg" from the resource 120 may either place the other document "photo.jpg" into the execution instance 114 or, depending upon the content owner, cause another execution instance to be generated.

In one example implementation, the resource 120 may help achieve content-based isolation by modifying header information within access request responses to include the content owner information such that the monitor component can more easily identify content owners and possibly, determine appropriate principal labels. The resource 120, for instance, may store a public key in the header information to function as a content owner identifier. As another example, the remote resource may include a related trust list with every response being returned to the computing device 102.

Figure 2:
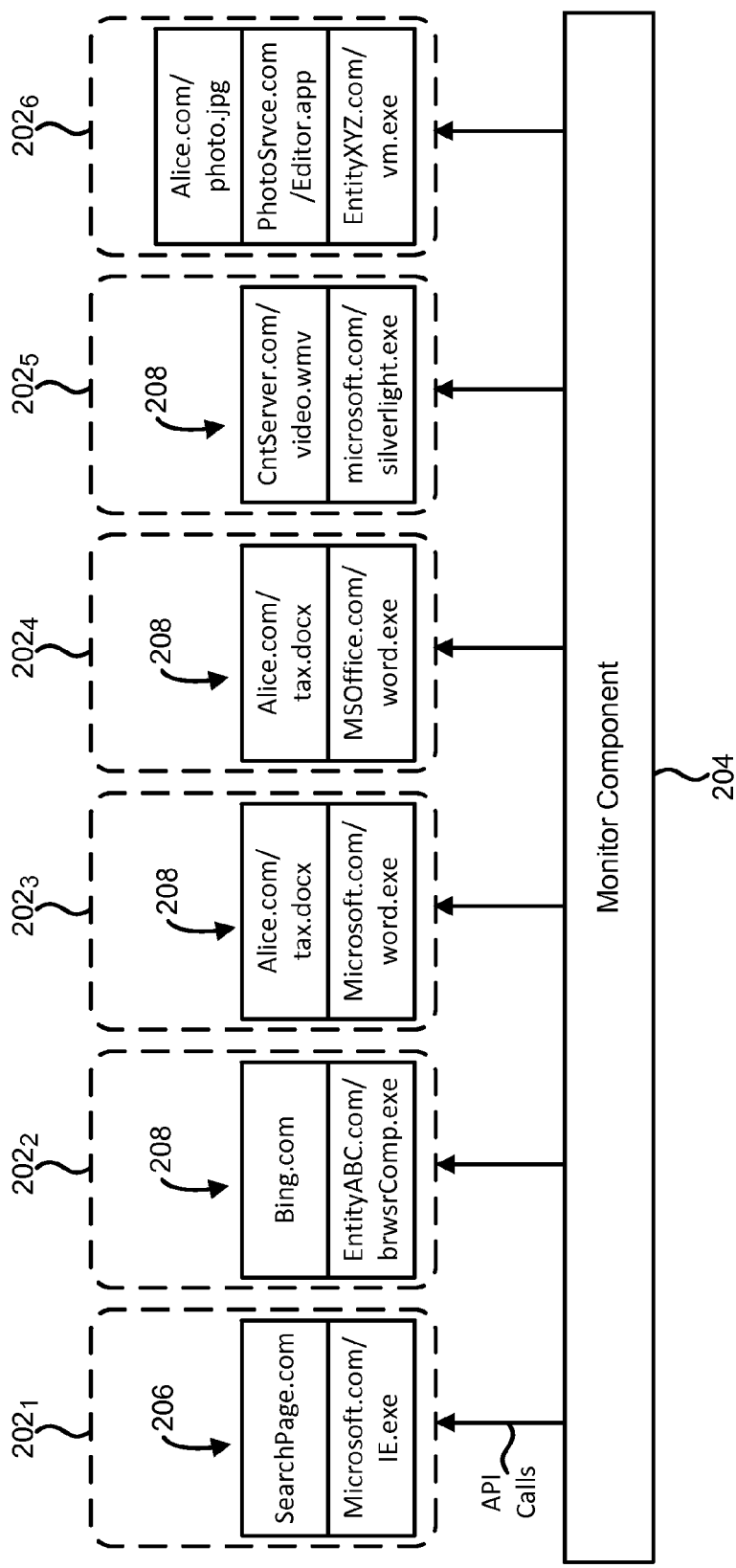
FIG. 2 is a functional block diagram illustrating a monitor component coupled to isolation containers according to one example implementation.

FIG. 2 is a functional block diagram illustrating a monitor component coupled to isolation containers according to one example implementation. FIG. 2 illustrates a number of execution instances (e.g., sometimes referred to as content processing stacks) within corresponding isolation containers $202_1$, $202_2$, $202_3$, $202_4$, $202_5$ and $202_6$. A monitor component 204 may be configured to delete and/or modify isolation containers $202_1$, $202_2$, $202_3$, $202_4$, $202_5$ and $202_6$ at any time and, if necessary, generate additional isolation containers.

To illustrate an example execution instance that corresponds to content from different owners, FIG. 2 provides the isolation container $202_6$ in which a document "photo.jpg" is rendered on a computing display by an editor program "editor.app" running on a Virtual Machine, which in turn is a Microsoft® Win32 program running on Microsoft® Windows®. The document "photo.jpg" may be addressed as "alice.com/photojpg" and downloaded from a corresponding location within a remote resource. Each individual piece of content—the document "photo.jpg", the editor program "editor.app" and the virtual machine "vm.exe"—corresponds to a different owner. For example, the document "photo.jpg", the editor program "editor.app" and the virtual machine "vm.exe" correspond to "alice.com", This is one example execution instance. Another example execution instance will be illustrated below.

To illustrate another example execution instance that corresponds to content from different owners, FIG. 2 provides the isolation container $202_5$ in which a video file "video.wmv" is rendered by a rich Internet application (RIA) runtime environment "Silverlight.exe" and presented to the user of the computing device 102. Although FIG. 2 depicts origin information "CntServer.com/video.wmv" and "Microsoft.com/Silverlight.exe" as principal labels for the video file "video.wmv" and the RIA runtime environment "Silverlight.exe" respectively, it is appreciated that other embodiments may employ alternative principal labeling schemas to content maintained within the isolation container $202_5$. Protocol schemes (e.g., HTTP, HTTPS and/or the like) in the origin information were omitted, but may be part of the principal label.

FIG. 2 represents each example execution instance as a content processing stack where each layer of the content processing stack includes addressable content data that is owned by some entity. The content data at a particular layer is consumed and processed by a next lower layer. Each layer below a top layer may be referred to as a content processor. The top layer(s) accordingly may be referred to as content. For example, a browser component may use a plug-in component to process certain content from the Internet. Content trust and/or compatibility between layers (e.g., adjacent layers) may be established by a content owner and/or the user. As an example, the content owner may define a content-to-processor mapping such that the document "alice.com/photo.jpg" is accessible to the trusted program "PhotoSrvce.com/editor.app" until the isolation container $202_6$ is modified or deleted.

For embodiments where content data is requested and distributed over a HTTP protocol, some trusted programs (e.g., tradition software application) may indicate the content data's MIME type using a Content-Type header in all HTTP responses. Other trusted programs may implement a Trust or Owner HTTP header attribute to allow content servers to specify desired or default content processors by a URL or an identifier. For example, a web server hosting "photo.jpg" could send header information comprising "Content-Processor: http://www.PhotoSrvce.com/editor.app" establishing a trusted program to process the "photo.jpg" as directed by the content owner. The web server may sign a portion of the header information with the content owner's private key. The monitor component 204 may store a content-to-processor mapping between "photo.jpg" and "editor.app" in the content owner information.

According to one example implementation, the monitor component 204 issues Application Programming Interface (API) calls invoking isolation mechanism functions in response to user activity (e.g., user click/command and/or the like). Some of these calls may result in the generation of an isolation container configured to secure content data from malicious software code. For instance, the monitor component 204 configures the isolation container $202_1$ to maintain an execution instance 206 in the form of a content processing stack comprising a web document and executed code from webpage "SearchPage.com" and/or a browser component "Microsoft.com/IE.exe" respectively, as depicted in FIG. 2. When the user opens the browser component "IE.exe" from "Microsoft.com" and navigates to the web page "SearchPage.com", the monitor component 204 isolates executed software code associated with the browser component and webpage data downloaded from an appropriated web server, which prevents untrusted programs from achieving access.

By way of example, in order to block untrusted programs and permit only trusted programs to access content maintained within an execution instance, one example implementation of the monitor component 204 defines a number of principal labels distinguishing the trusted programs from the untrusted programs. Each execution instance may be assigned a principal label comprising each webpage origin (e.g., an origin stack). The monitor component 204, for example, may express an example principal label for the execution instance 206 as follows:

SearchPage.com
Microsoft.com

The user may access a remote resource corresponding to content owner "EntityABC.com", execute software code for a different browser component "EntityABC.com/brwsrComp.exe" and then, use this browser component to communicate information to another remote resource for webpage "Bing.com" requesting web content. In response to such user activity, the monitor component 204 generates an execution instance 208 within the isolation container $202_2$ and secures the web content and the executed software code from untrusted programs according to one example implementation.

Another principal labeling implementation provides a public key to identify a particular entity as a content owner. The monitor component 204 may couple the public key to, for example, URL-addressable content by tagging such content with an appropriate content owner's public key and a corresponding host URL's signature. The signature indicates that the corresponding host URL maps to a remote resource owned by the entity associated with the public key. A content processing stack, for example, is labeled with a stack of public key-based principals (e.g., referred to as an owner stack). The monitor component 204 considers content processing stacks with a same owner stack as having a same principal. A HTTP response header for an example embodiment employing the public key includes: "Owner: publicKey=<key>; hostURLSig=signed(responseURL)."

In one optional implementation, the monitor component 204 processes a resource access request augmented with a trust list associated with content data at any URL addressed resource (e.g., a content server). Such content data may trust other content data located at remote resources in a unilateral/one-way trust relationship or a bidirectional trust relationship in which both sets of content data share mutual trust.

Mutually trusted content from different resources reside in a same execution instance. The isolation container $202_3$, for example, comprises an execution instance of mutually trusted content corresponding to "Microsoft.com" and "alice.com" as illustrated in FIG. 2. The monitor component may admit content into the isolation container $202_3$ if and only if the documents "alice.com/tax.docx" and "Microsoft.com/word.exe" trust such content and vice versa. The trust list may record a set of URLs hosting trusted content with which the content data may access and/or coexist in the same execution instance. Trust lists may be employed in computing devices that isolate content using a same origin policy.

In one example implementation, the monitor component 204 specifies a trust list within a HTTP header attribute (e.g., a "Trust" HTTP header attribute), which may comprise the trust list itself or, alternatively, a resource locator (e.g., a URL) pointing to the trust list. The trust list includes URLs, which refers to a path/address representing a specific location or locations within a resource where content is stored. The monitor component 204 may optionally enable a wildcard operator "*" at the end of the URL when enumerating all content at that path/address. When the HTTP header attribute is missing, the monitor component 204 reverts to a principal labeling schema that assigns content server origin information to returned content. For content communicating over non-HTTP technology, the monitor component 204 may resort to a same origin policy (SOP) principal labeling schema in which all content from an origin corresponds to a trust list comprising the origin URL followed by a wildcard operator. For example, when content associated with "CntServer.com" and content associated with "bing.com" resolve to a same principal label, independent content servers for "bing.com" and "CntServer.com" provides HTTP responses storing HTTP header attributes "Trust:list=http://CntServer.com/" and "Trust:list=http://bing.com/" respectively.

Consider the following example of using a HTTP header attribute to achieve a fine-grained principal labeling schema. After receiving HTTP responses comprising content data from URL "http://blog.com/alice/index.html" and a HTTP header attribute set to "Trust:list=http://blog.com/alice/*", the monitor component 204 permits access to any data from path/address "http://blog.com/alice/" such that the content data shares an isolation container with such data. To achieve path-based principal isolation, the monitor component 204 does not trust content addressed from URL "http://blog.com/" because such a path does not identify the "alice" subdirectory. Alternatively, the HTTP header attribute identifies individual document URLs to achieve document-level granularity of isolation.

Figure 3:
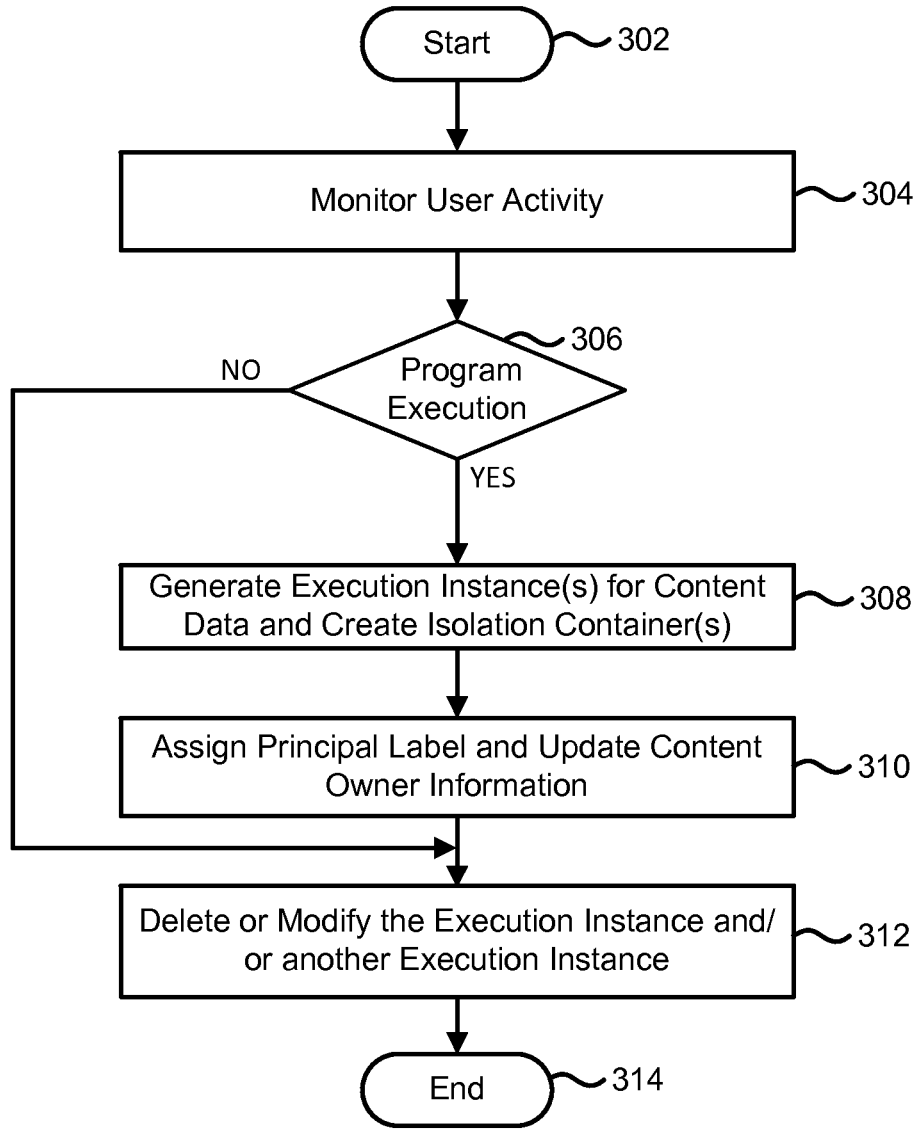
FIG. 3 is a flow diagram illustrating example steps for isolating program execution based upon content according to one example implementation.

FIG. 3 is a flow diagram illustrating example steps for isolating program execution based upon content according to one example implementation. One or more software components (e.g., an operating system component, such as the monitor component 106 of FIG. 1) may be configured to perform the example steps. Step 302 commences the example steps and proceeds to step 304 where user activity is monitored. Step 306 determines whether the user activity resulted in program execution.

If the user activity did not cause the execution of any software program, step 306 proceeds to step 312. Step 312 refers to modifying or deleting an execution instance in response to the user activity. If the user updated existing content and/or requested additional content, the execution instance is modified such that other trusted content within the execution instance may access either the updated content or the additional content. The execution instance may be deleted if the user closes or deletes the existing content.

If the user activity caused the execution of a software program, step 306 proceeds to step 308. This occurs, for example, when the user opens a document (e.g., a word processing document or a spreadsheet) through a software application or downloads a web page through a browser component. Program execution also may occur when the software application or the browser component causes the execution of another software program (e.g., a plug-in). Step 308 refers to generating one or more execution instances of content data corresponding to the user activity and creating one or more isolation containers to maintain the one or more execution instances. Step 310 refers to assigning a principal label and updating content owner information. Step 312 is directed to modifying or deleting the one or more execution instances when the user updates and/or closes the content. Step 314 terminates the example steps described in FIG. 3.

Figure 4:
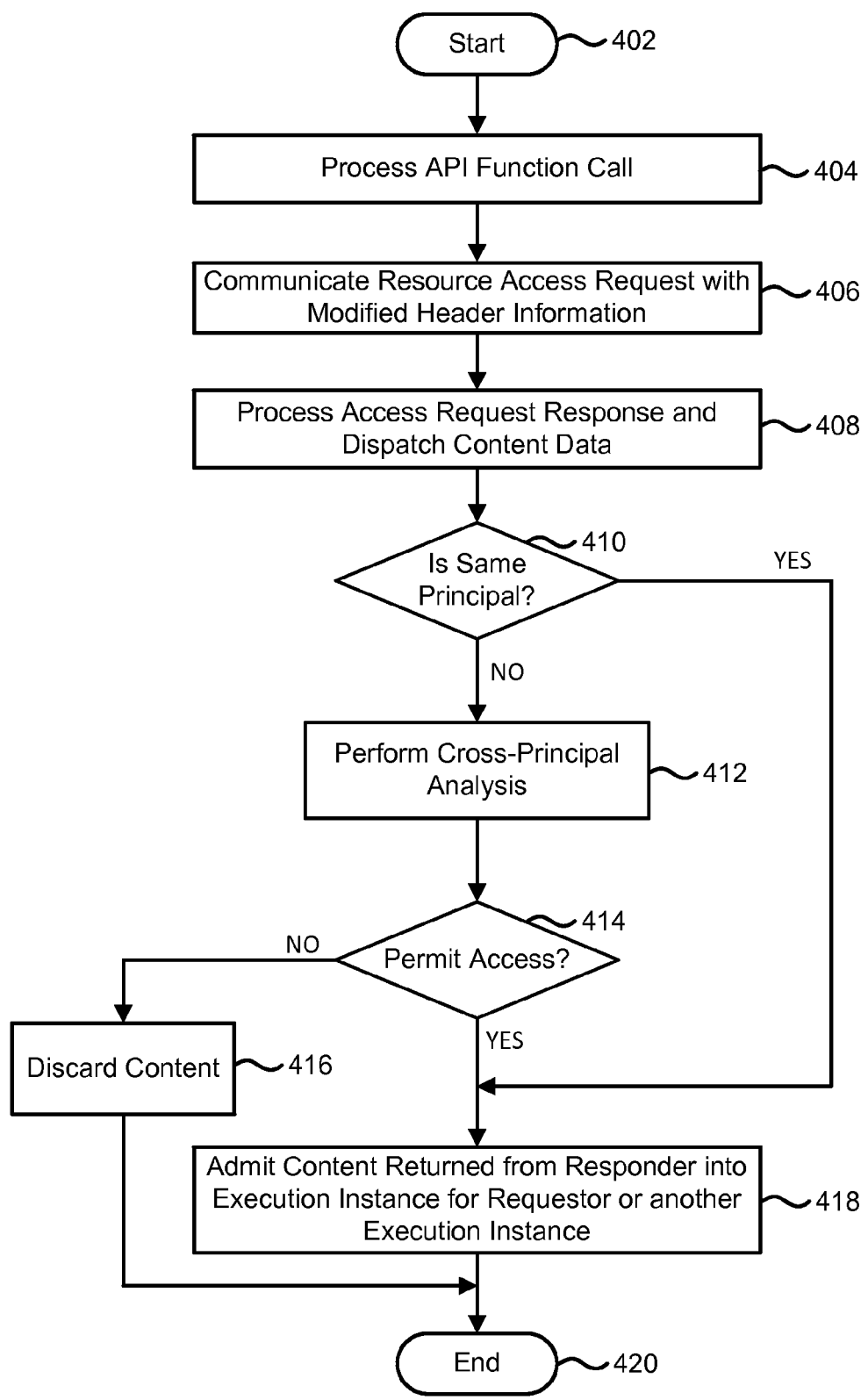
FIG. 4 is a flow diagram illustrating example steps for handling an access resource request between an execution instance and a resource according to one example implementation.

FIG. 4 is a flow diagram illustrating example steps for handling an access resource request between an execution instance and a resource according to one example implementation. The monitor component 108 may perform the example steps, which commence at step 402 and proceed to step 404 at which an API function call is processed. A Fetch function call is one example API function call.

Step 406 is directed to communicating a request access request for content data. According to one example implementation, the monitor component receives request data via an operating system component and transforms the request data into the request access request as described herein. After extracting header information from the request data, the monitor component may modify the header information to include a principal label corresponding to the requestor and generates the resource access request with the modified header information. For instance, the API function call may include an HTTP request that is generated by a browser component. The monitor component may be configured to modify a HTTP header attribute, such as an "Owner" or "Trust" HTTP header attribute, for a HTTP request/response.

The monitor component stores the requester principal label in an "Origin" header attribute of the resource access request in order to inform the responder as to the requestor content owner identity. The responder may implement a proprietary request-authorization protocol configured to verify the requester principal label. The responder specifies dispatch data (e.g., a dispatch bit) within the access request response in order to differentiate between different types of acceptable cross-principal communication. Example acceptable forms of cross-principal communication may include: (1) Data communication where a requester wants some data from a responder server, (2) Spawning a new principal where the requester wants to spawn a new execution instance corresponding to the responder principal label, (3) acknowledging prior dispatch data and/or the like. Spawning a new principal may occur when a user clicks on a hyperlink to open a new document or a document corresponding to the requester principal label embeds content corresponding to the responder principal label.

Step 408 represents access request response processing. According to one example implementation, the monitor component receives the access request response from the responder as a response to the resource access request. The access request response may include the requested content data as well as header information comprising a trust list and/or content owner information. Based upon the header information, the monitor component dispatches the content data to an execution instance corresponding to a requestor principal label or a responder principal label.

Figure 5:
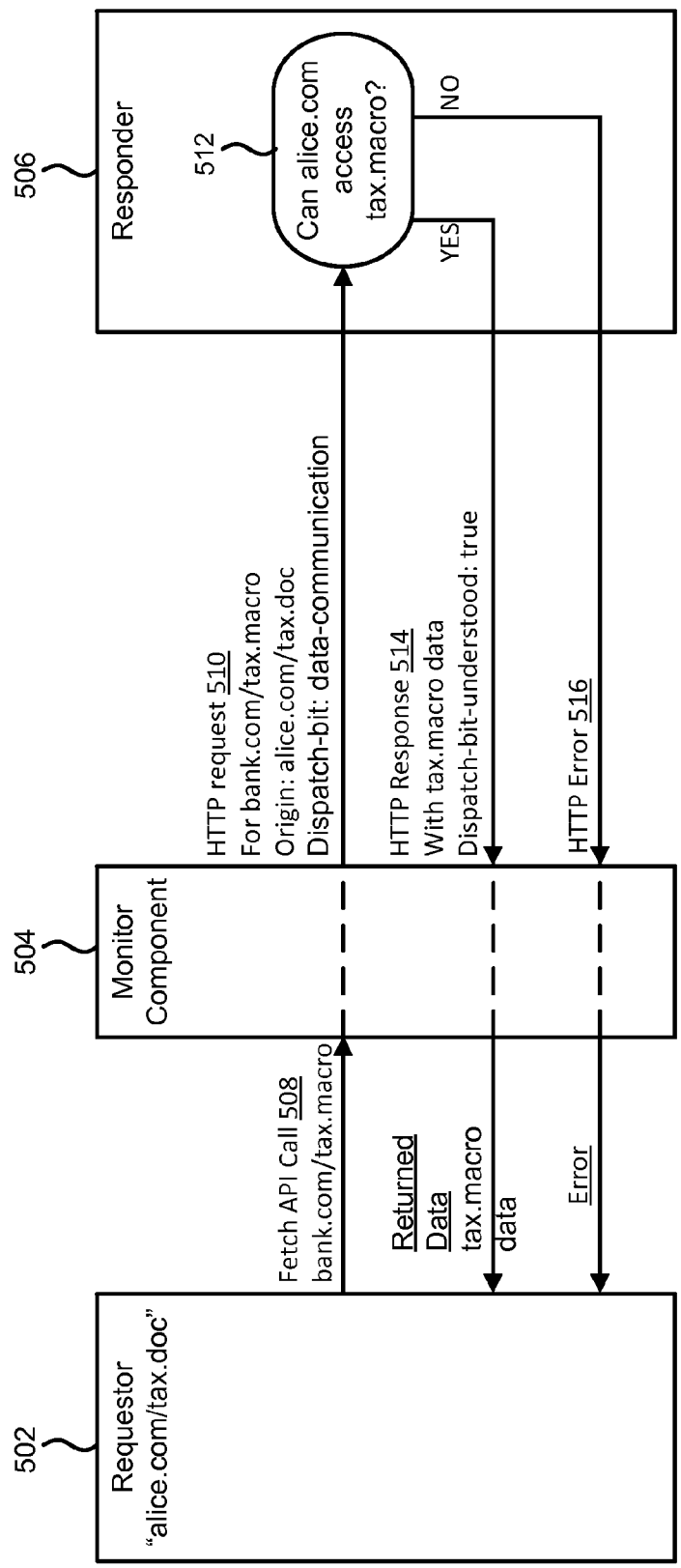
FIG. 5 illustrates a requestor-driven approach to dispatching returned content from a resource according to one example implementation.
Figure 6:
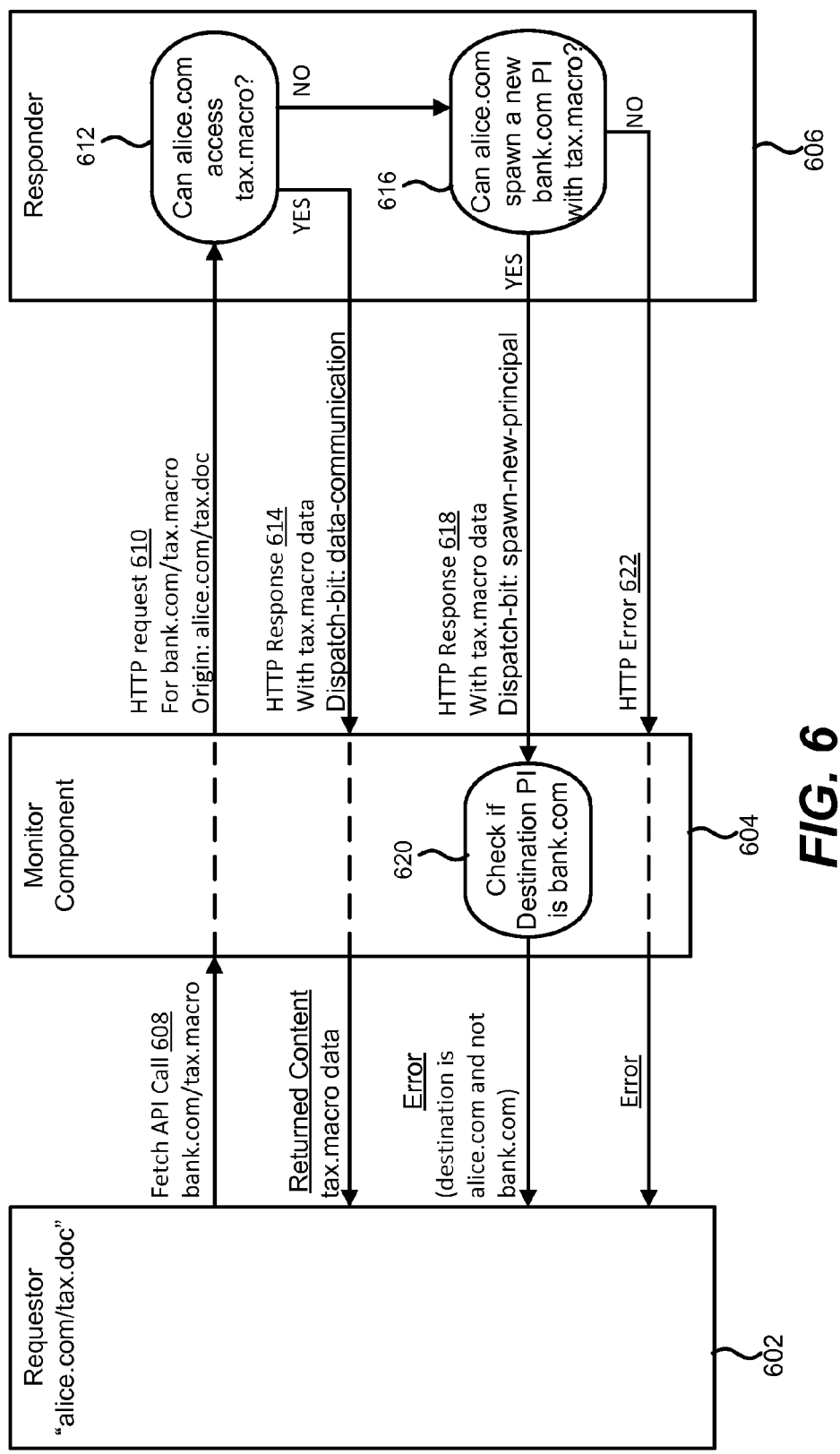
FIG. 6 illustrates a responder-driven approach to dispatching returned content from a resource according to one example implementation.

FIG. 5 and FIG. 6 illustrate two exemplary approaches to dispatching the content data to the requestor. Both of these approaches support legacy web servers. If the responder provides a HTTP response that is devoid of dispatch data, the monitor component recognizes the responder to be a legacy web server. If the monitor component determines that the HTTP response does not acknowledge the dispatch data from the preceding HTTP request, the responder is most likely a legacy web server. When dispatching the returned content data of the legacy web servers, the monitor component relays such content data to the execution instance corresponding to the responder principal label.

Herein describes step 410 to step 420, representing content-based isolation policy enforcement according to one or more example implementations. Step 410 determines whether the content data and the execution instance corresponding to the resource access request resolve to a same principal. If it is determined that the content data and the execution instance do not resolve to the same principal, step 410 proceeds to step 412, which determines whether the execution instance may access the returned content data despite such content data resolving to a different principal. For instance, if the returned content data and the execution instance resolve to different principal labels, the returned content and/or the content data in the execution instance may include malicious software code. On the other hand, respective content owners may still trust each other enough to permit cross-principal access at step 414 based upon the cross-principal analysis performed at step 412. FIG. 5 and FIG. 6 represent example implementations for the cross-principal analysis and related policy enforcement, as described for step 412 and step 414. If the returned content data and the execution instance resolve to the same principal, step 410 proceeds to step 418.

Content-based isolation policy enforcement may involve enforcing an "Owner" or "Trust" header attribute for a HTTP request/response. One example embodiment enforces the "Trust" header attribute by maintaining a stack C of effective principal labels to represent an execution instance within in an isolation container according to one example implementation. An effective principal label, for example, of layer L may include a set of URLs aggregated from content data corresponding to each layer L of all execution instances. The following represents one example embodiment of step 410 where the effective label stack C requests access to content at a resource having a URL u.

```
 1: function IsSamePrincipal (C, u) {
 2:      us1 = C.TopLayerUrls( );
 3:      us2 = {u};
 4:      repeat {
 5:          if (not MutuallyTrusted (us1, us2))
 6:              return false
 7:          us1 = us1.processors
 8:          us2 = us2.processors
 9:      } until (us2.processors == null)
10:      UpdateContainerLabelWithNewURL (C, u)
11:      return true
12:}
13:
14: function MutuallyTrusted(URLSet1, URLSet2) f
15:      for each u1 in URLSet1
16:      for each u2 in URLSet2
17:          if (u1 =2 u2.TrustList or u2 =2 u1.TrustList)
18:              return false
19:      return true
20:}
```

By implementing the above code, given an HTTP response comprising addressable content associated with a URL u and a related trust list, the monitor component determines whether to admit this content into the isolation container. As one example, if the URL u trust list and the stack C indicate mutual trust, the monitor component isolates the addressable content corresponding to the URL u in accordance with a content-processor mapping for the stack C. The IsSamePrincipal(C,u) function iterates over the URL u and any lower content processor layers and determines that each layer mutually trusts each corresponding layer of the effective label stack C. Accordingly, the monitor component updates the stack C with the URL u and effective labels for the lower content processors.

If the IsSamePrincipal(C, u) function returns false, the monitor component may perform a cross-principal analysis at step 412 and then, given the results of the cross-principal analysis, determine whether to permit the isolation container access to the returned content data at step 414. Some example embodiments specify a dispatch bit within the HTTP request or the HTTP response, as described for FIG. 5 and FIG. 6, respectively, in which the dispatch bit instructs the monitor component to either discard the addressable content associated with URL u as described for step 416 or nevertheless admit the addressable content, as described for step 418, into the isolation instance for stack C or a new isolation instance labeled u. If the HTTP request and the HTTP response lack such dispatch data, the monitoring component also discards the addressable content. The example steps described for FIG. 4 terminate at step 420.

FIG. 5 illustrates a requestor-driven approach to dispatching returned content from a resource according to one example implementation. A requestor 502 refers to an isolation container comprising an execution instance of trusted content, as described herein. A monitor component 504 may be configured to assign a principal label to the requestor 502 and/or enforce the principal label against content provided by remote resources, such as a responder 506.

In one example implementation, an origin corresponding to the requestor 502 is used as a principal label. The monitor component 504 assigns to the requestor 502 the principal label of "alice.com/tax.doc" as illustrated in FIG. 5, denoting a document having a content owner associated with "alice.com." When requesting addressable content data from the responder 506, the requestor 502 invokes an API function call of the monitor component 504. A Fetch API Call 508, for instance, requests the content data corresponding to "bank.com/tax.macro" from the responder 506. The monitor component 504 transforms the Fetch API Call 508 into a HTTP request 510 with modified header information, as depicted in FIG. 5 and communicates the HTTP request 510 to the responder 506.

Within one example embodiment of the HTTP request 510, the monitor component 504 sets a dispatch-bit to "data-communication" indicating to the responder 506 that any returned content is to be admitted into the execution instance corresponding to the requestor 502. The dispatch-bit enables the responder 506 to optimize HTTP responses that are expected to be dropped and, possibly, return errors instead of content. According to one alternative embodiment of the HTTP request 510, the requestor 502 sets the dispatch-bit to "spawn-new-principal" indicating that any returned content is to be admitted into a different execution instance corresponding to the responder 506.

The responder 506 performs a decision 512 as to whether principal label/content owner "alice.com" is authorized to access "tax.macro." If related content data for "tax.macro" can be accessed by content within the isolation container for the requestor 502 or, alternatively, by content within an isolation container for the responder 506, the monitor component 504 returns the related content data to an appropriate isolation container. If, for instance, it is determined that "alice.com" can access the related content data, the responder 506 returns a HTTP response 514 with attribute "dispatch-bit-understood" set to "true" in response to the HTTP request 510. The monitor component 504 communicates the related content data returned from the responder 506 to the requestor 502. If the responder 506 determines that "alice.com" cannot access the related content data, a HTTP error 516 is returned to the monitor component 504, which relays the HTTP error 516 to the requestor 502.

FIG. 6 illustrates a responder-driven approach to dispatching returned content from a resource according to one example implementation. Similar to the requestor 502 of FIG. 5, a requestor 602 refers to an isolation container comprising an execution instance of trusted content. Furthermore, a monitor component 604 may be configured to assign a principal label to the requestor 602 and/or enforce the principal label against content provided by a responder 606.

In one example implementation, the requestor 602 invokes a Fetch API call 608 requesting content data at address "bank.com/tax.macro" of which the monitor component 604 transforms into a HTTP request 610. The monitor component 604 adds a header attribute to the HTTP request 610 and stores a principal label for the requestor 602 into the header attribute. As an example, the requestor 602 may be assigned a principal label of "alice.com/tax.doc" in order to identify an appropriate content owner and/or content origin.

The HTTP request 610 may prompt the responder 606 to render a decision 612 as to whether content data having an origin address "alice.com" can access content data corresponding to "tax.macro" even through the responder 606 and the requestor 602 resolve to different principal labels. If the responder 606 permits content data owned by "alice.com" to access the content data corresponding to "tax.macro", the responder 606 communicates a HTTP response 614 to the monitor component 604, returning the content data corresponding to "tax.macro" to the requestor 602. The monitor component 604 may admit the returned content data into the execution instance for the requestor 602 if a dispatch-bit is set to "data-communication" indicating that "alice.com/tax.doc" is deemed trusted content. The monitor component 604 may relay the HTTP response 614 to a browser component having a same principal label and/or within the same execution instance as the requestor 602. The advantage of putting the bit in the HTTP response 614 is that it can be statically configured for each URL, rather than having the server perform access control checks for each request and reduce network overhead. When the dispatch bit from the HTTP response 614 differs from that of a HTTP request (e.g., the HTTP request 510 or the HTTP request 610), the response's dispatch bit takes precedence.

If the responder 606 determines that content data corresponding to "alice.com" cannot access the content data corresponding to "tax.macro", the responder 606 proceeds to decision 616 and determines whether the requestor 602 can spawn a new execution instance in which "bank.com" forms at least a portion of an assigned principal label. If so, the responder 606 communicates a HTTP response 618 with a dispatch-bit set to "spawn-new-principal" indicating that a new execution instance for a responder principal label is to be generated. In turn, the monitor component 604 performs a decision 620 to determine whether a destination execution instance resolves to the responder principal label. If the monitor component 604 determines that the destination execution instance resolves to the responder principal label, the monitor component 604 admits the content data corresponding to "tax.macro" into the destination execution instance. Otherwise, the monitor component 604 returns an error. If the content data owned by "alice.com" is not permitted to access the content data corresponding to "tax.macro" and/or cannot spawn a new execution instance for the responder principal label, the responder 606 communicates a HTTP error 622 is returned to the monitor component 604, which returns an error to the requestor 602.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
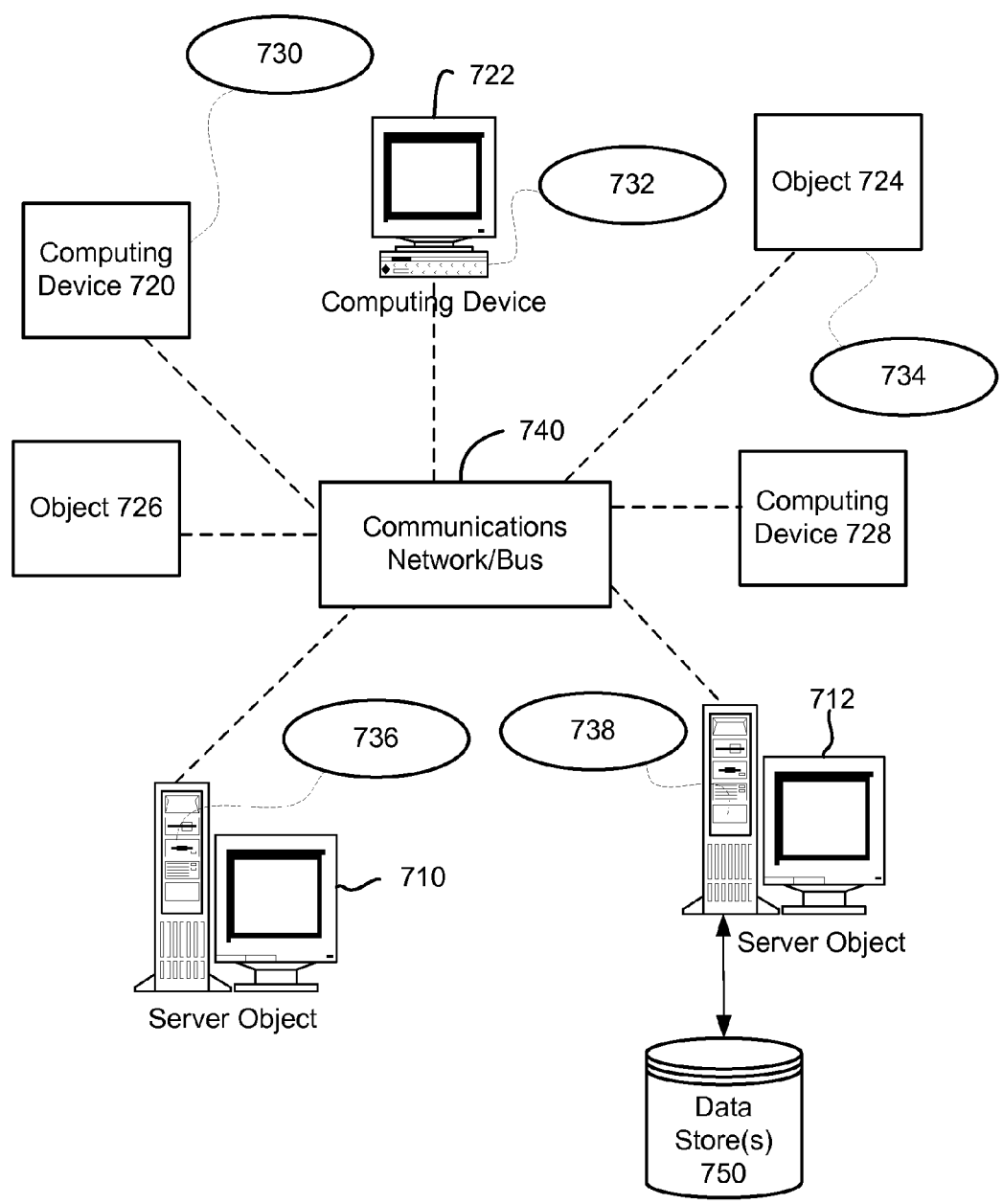
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
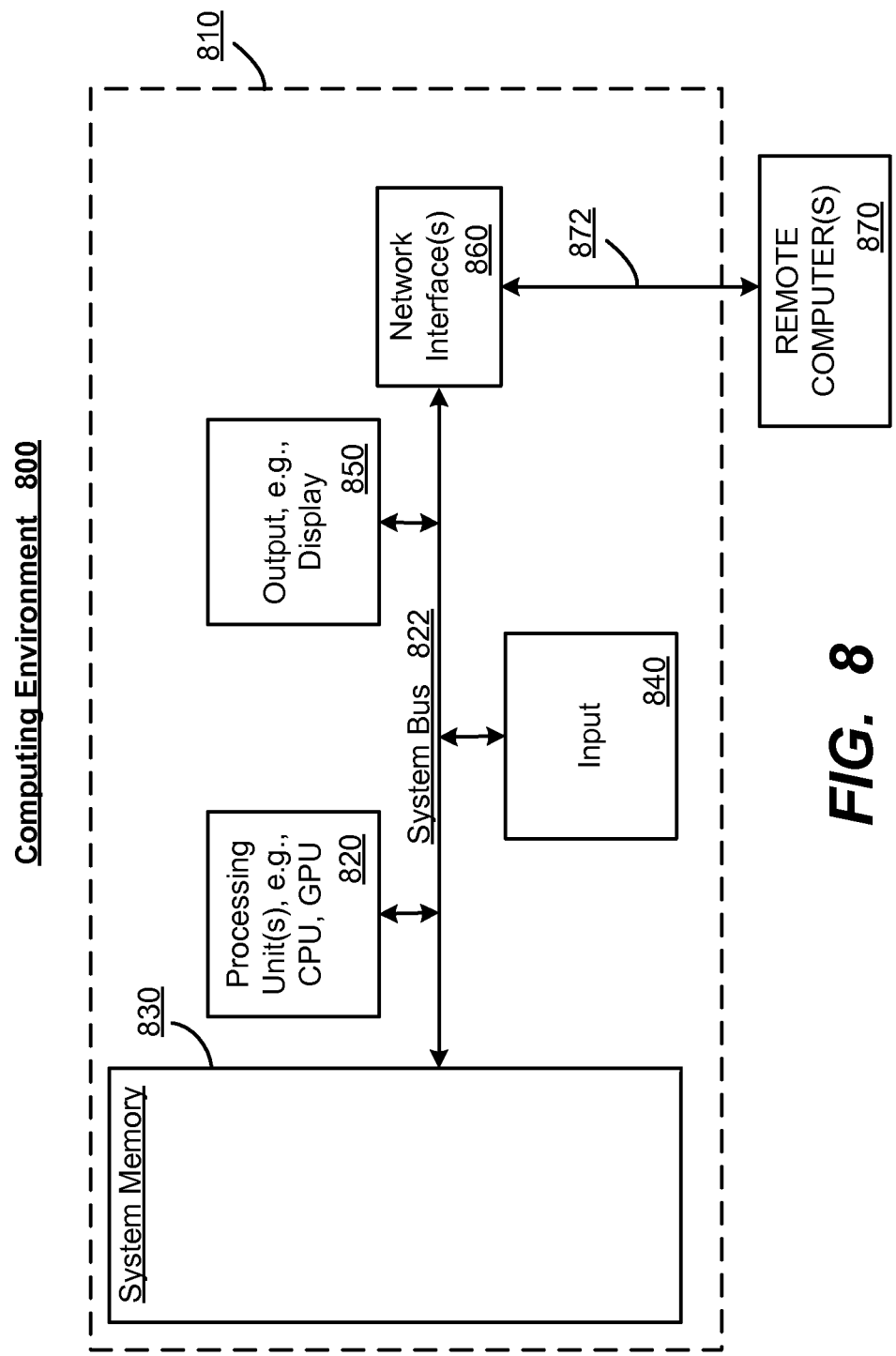
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for providing content-based isolation for a computing device performed at least in part on at least one processor, comprising:
monitoring user activity at the computing device;
identifying content data corresponding to the user activity;
accessing at least one isolation container for processing the content data based upon content owner information, wherein each isolation container comprises an execution instance of which a first portion corresponds to trusted content and one or more other portions correspond to one or more trusted programs, the first portion operative to request the trusted content from a remote resource for processing by the one or more trusted programs; and
preventing at least one program outside the isolation container from accessing content data within the isolation container.

2. The method of claim 1 further comprising defining a principal label schema for grouping trusted portions of the content data.

3. The method of claim 1 further comprising determining whether content from a remote resource and the execution instance resolve to a same principal label.

4. The method of claim 3 further comprising admitting the content into the execution instance.

5. The method of claim 3 further comprising assigning a principal label to the execution instance, modifying header information within a resource access request to include the principal label and communicating the resource access request to the remote resource.

6. The method of claim 3 further comprising if the remote resource and the execution instance resolve to different principal labels, processing dispatch data of an access request response.

7. The method of claim 3 further comprising if an access request response indicates an error, discarding the content provided by the remote resource.

8. The method of claim 1 further comprising processing one or more mappings between content owner and one or more trusted programs operating at the computing device, using the mappings to identify an isolation container that maintains a content processing stack for the trusted content, the content processing stack comprises a top layer corresponding to a document and one or more lower layers corresponding to the one or more trusted programs, the top layer requests content data from a remote resource for the document, inserting the content data into the isolation container, and preventing each trusted program from accessing content data outside the isolation container maintaining the content processing stack for that trusted program.

9. In a computing environment, an apparatus, comprising:
a processing unit;
a system memory;
a monitor component executing on the processing unit to secure a computing device from malicious activity, wherein the monitor component is configured to:
store content owner information for sets of trusted content,
isolate each set of trusted content within one or more isolation containers,
request access to data provided by one or more resources using the content owner information,
process returned content from the one or more resources based upon the content owner information,
insert the returned content into an isolation container that maintains a content processing stack for the returned content, the content processing stack comprising a top layer corresponding to the returned content and one or more lower layers corresponding to one or more trusted programs, and
prevent at least one program outside the isolation container from accessing the returned content within the isolation container.

10. The apparatus of claim 9, wherein the monitor component is further configured to determine principal labels for the returned content, identify one or more execution instances based upon the principal labels, and add the returned content to the one or more execution instances within the one or more isolation containers, wherein the execution instances comprise one or more trusted programs.

11. The apparatus of claim 9, wherein the monitor component is further configured to modify header information of a HTTP request and store a content owner identifier in a HTTP header attribute.

12. The apparatus of claim 11, wherein the monitor component is further configured to modify header information of the HTTP request and store a trust list in another HTTP header attribute.

13. The apparatus of claim 9, wherein the monitor component is further configured to permit a requestor to access the returned content if a responder resolves to a same principal label and if the requestor corresponds to a different principal label, perform a cross-principal analysis using dispatch data associated with the returned content.

14. The apparatus of claim 13, wherein the monitor component is further configured to generate one or more new execution instances for the returned content if a dispatch bit is set to spawning a new principal label.

15. The apparatus of claim 13, wherein the monitor component is further configured to admit the returned data into the one or more execution instances in response to the dispatch data.

16. The apparatus of claim 9, wherein the monitor component is further configured to store a public key in a header attribute of a resource access request, wherein the public key represents at least a portion of a principal label assigned to an execution instance within the one or more isolation containers.

17. The apparatus of claim 9, wherein the monitor component is further configured to store a trust list in a header attribute of a resource access request, the trust list comprises mappings between content data and trusted programs.

18. An article of manufacture comprising one or more computer-readable storage devices having computer-executable instructions, which when executed perform steps, comprising:
- processing resource access requests for addressable content that are communicated from computing devices, wherein addressable content is located at a remote resource;
- communicating the resource access requests to the remote resources, the resource access requests comprising header information identifying content owners of content data within an isolation container, the content data corresponding to a portion of the addressable content;
- returning responses to the computing devices that correspond to the resource access requests;
- dispatching the content data to the isolation container that includes at least one trusted program corresponding to a content owner identifier stored in the responses; and
- preventing at least one program outside the isolation container from accessing the content data within the isolation container.

19. The article of manufacture of claim 18 having further computer-executable instructions comprising:
- processing a resource access request; and
- using dispatch data to determine whether to return content in response to the resource access request, wherein the dispatch data comprises a dispatch bit set to indicate generating a new isolation container for the addressable content, adding the addressable content to an existing isolation container, or acknowledging prior dispatch data.

20. The article of manufacture of claim 18 having further computer-executable instructions comprising:
- processing header information of a response to a resource access request, wherein the header information comprises at least one of a public key, a trust list or a dispatch bit associated with cross-principal communication; and
- communicating the response based on the header information.

* * * * *